UNITED STATES PATENT OFFICE

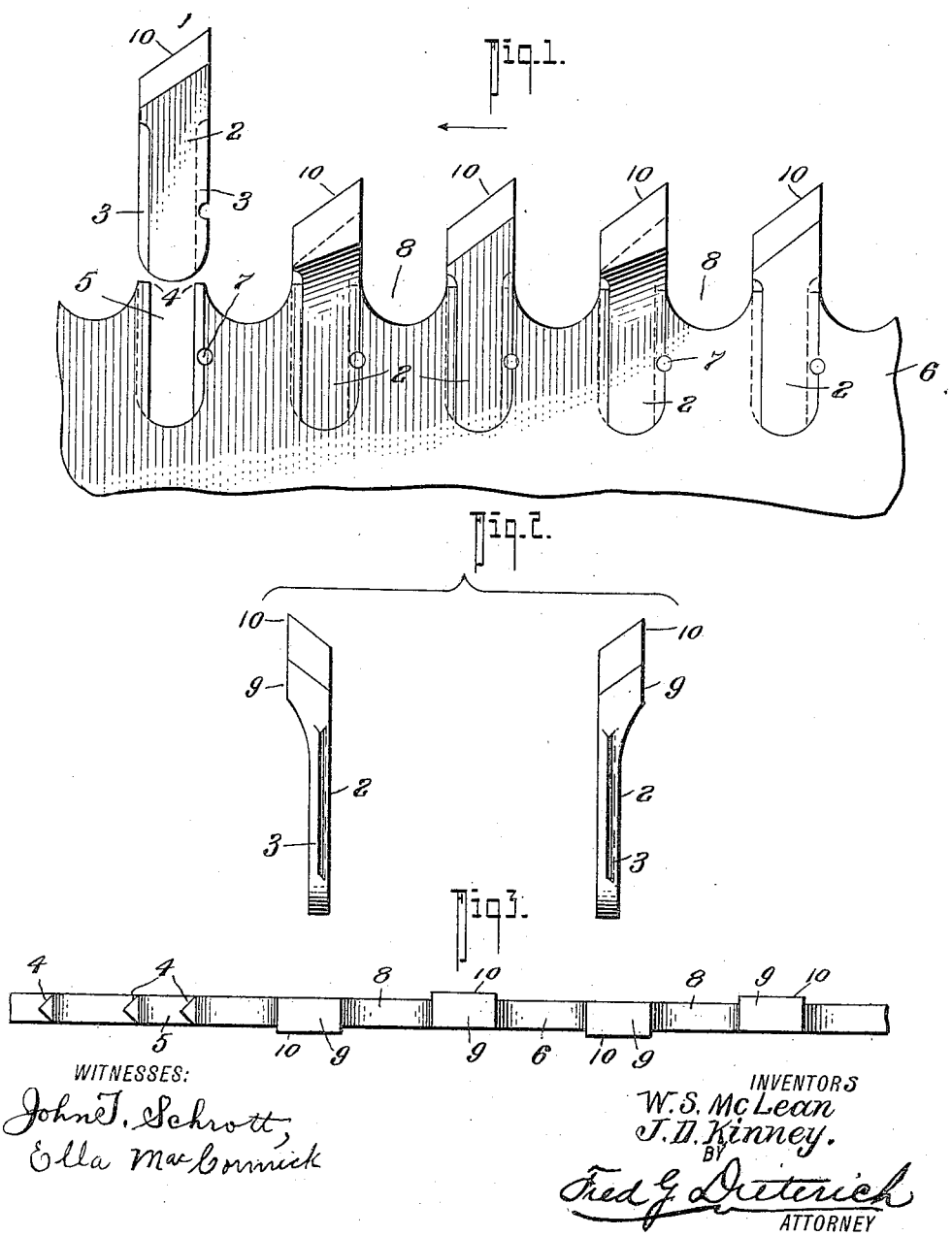

WILLIAM S. McLEAN, OF VANCOUVER, AND JAMES D. KINNEY, OF NEW WESTMINSTER, CANADA.

INSERTED SAW-TOOTH.

No. 816,592. Specification of Letters Patent. Patented April 3, 1906.

Application filed March 27, 1905. Serial No. 252,340.

*To all whom it may concern:*

Be it known that we, WILLIAM S. MCLEAN, residing at Vancouver, and JAMES D. KINNEY, residing at New Westminster, in the Province of British Columbia, Canada, citizens of the Dominion of Canada, have invented a new and useful Improvement in Inserted Saw-Teeth, of which the following is a specification.

Our invention relates to an inserted tooth for a cut-off saw which is designed to confer upon a saw of that class the advantages incident to inserted teeth generally and the form of which will insure smoother work being done than where the teeth are cut from the blade and set or where inserted teeth of ordinary form are used.

The particular design and application of the tooth is fully described and its advantages set forth in the following specification, reference being made to the drawings which accompany it, in which—

Figure 1 is a side elevation of the teeth, showing their application to a section of the saw-blade the curvature of which is for purposes of illustration neglected. Fig. 2 shows a front end elevation of alternate teeth detached from the saw-blade, and Fig. 3 is a top view of a section of a saw-blade fitted with these improved teeth.

The teeth are of simple pillar shape, each tooth-bit being formed of a body portion 2, having parallel side faces and formed with a V-shaped rib on one edge and a V-shaped groove on the opposite edge to fit correspondingly-shaped edges 4 of the apertures 5 in the edge of the saw-blade 6 designed to receive the teeth. Into these apertures 5 the bits are tightly driven and secured by a rivet 7 in the joint. The bits outwardly project beyond the edge of the saw-blade a sufficient distance to afford with a slight gullet 8 in the blade 6 between each tooth a sufficient space for the sawdust cut by the tooth, and the outwardly-projecting ends of the bits are swaged or offset alternately to opposite sides, as at 9, to afford a sufficient clearance in the cut for the blade of the saw. The outer end of each tooth-bit is ground to a plane sloping downward toward the direction in which the saw is designed to move, as indicated by the arrow in Fig. 1, and also toward the side of the tooth opposite to the swaged offset 9, so that a reasonably acute cutting edge 10 is provided on the outer side of each alternate tooth, which edge will cut through the grain of the wood by an oblique slicing action, which will leave a smooth clean surface.

The simple pillar form of an inserted tooth having a side face-cutting edge sloping downward toward the direction of movement is the principal novel feature in the design. A comparatively narrow tooth may thus be used and a larger number introduced into a saw than is practicable with a tooth of ordinary construction. This fact and the downward slope to the front of the side cutting edge will enable smoother work to be performed than can be done by other saws.

Having now particularly described our invention and the manner of its application to cut-off saws, we hereby state that what we claim as new, and desire to be protected in by Letters Patent, is—

In a cut-off saw, an inserted tooth consisting of a bit having parallel side faces, the portions by which said tooth is secured to the blade being of the same thickness as the blade, means for securing the tooth to the blade, said tooth having a projecting portion of greater thickness than the saw-blade, which portion is provided with parallel side faces, the outer end of the bit being ground to a moderately acute angle, the end plane of which slopes downwardly in the direction of the intended movement of the saw, such downwardly-sloping planes of alternate teeth sloping toward opposite sides of the saw-blade, substantially as shown and described.

In testimony whereof we have signed our names to this specification in the presence of two subscribing witnesses.

WILLIAM S. McLEAN.
JAMES D. KINNEY.

Witnesses:
ROWLAND BRITTAIN,
W. H. WYLES.